Sept. 15, 1942. H. W. RUBINSTEIN 2,296,058
INTERCHANGEABLE KNOB SHAFT ASSEMBLY
Filed June 14, 1941

INVENTOR.
HARRY W. RUBINSTEIN.
BY John W. Michael
ATTORNEY.

Patented Sept. 15, 1942

2,296,058

UNITED STATES PATENT OFFICE 2,296,058

INTERCHANGEABLE KNOB SHAFT ASSEMBLY

Harry W. Rubinstein, Milwaukee, Wis., assignor to Globe-Union Inc., Milwaukee, Wis., a corporation of Delaware Application June 14, 1941, Serial No. 398,037

5 Claims. (Cl. 287—53)

This invention relates to an improvement in a control or operating device of the type commonly used on electrical apparatus or appliances, as for example on a radio receiver for controlling the volume of reception or reproduction, or for other similar purposes.

In the case of a volume control, it is customary to have the operating shaft, for the movable contact of the variable resistance embodied in such control, provided at its outer end with an operating knob, the knob having a socket receiving the outer end of the shaft and detachably fastened thereto.

In some instances, such operating shafts are of round stock, while in others they are constituted of flat stock. One effective way of releasably but effectively interconnecting or interlocking such a control knob with its shaft, in instances where the shaft is rounded, is to slot or split the outer end of the shaft and form the peripheral portions of the split outer end with integral, longitudinally extending splines or knurls. In such a construction the socket of the knob is formed with similar integral, longitudinally extending splines on its inner peripheral wall, and the diameter of the socket is made slightly less than the external diameter of the split end portion of the shaft so that when the end of the shaft is forced into the socket, the shaft sections on the opposite side of the split are pressed toward each other against the inherent resiliency of the shaft. In this way a positive driving connection is established between the knob and the shaft and the knob is releasably held against axial displacement off the end of the shaft.

The present invention proposes to adapt a construction of this character for use not only with the round shafts but also with shafts of flat stock which have their outer ends slotted or split. To accomplish this the present invention proposes to construct the knob not only with the integral, longitudinally extending splines on its inner peripheral wall, but also to form the inner peripheral wall of the socket with diametrically opposite, longitudinally extending keyways, each extending from one end of the socket to the other and connected at their inner ends by a diametrically extending or transverse keyway formed in the inner wall of the socket. A knob so constructed may be interchangeable or selectively employed either with a round shaft or with a shaft of flat stock, the shaft of flat stock being introduced into the keyways and being interlocked therewith to rotatively couple the knob and shaft and also releasably hold the knob against axial displacement off the end of the shaft.

Other objects and advantages reside in certain novel features of the construction, arrangement, and combination of parts, which will be hereinafter more fully described and particularly pointed out in the appended claims, reference being had to the accompanying drawing forming a part of this specification, and in which:

Figure 2:
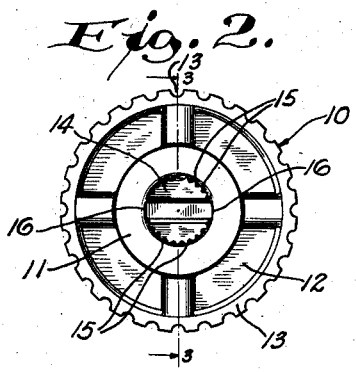
Figure 2 is a view in elevation looking at the inner side of a knob constructed in accordance with the present invention, the shaft being omitted.

Referring to the drawing, and more especially to Figures 1 to 4, inclusive, the numeral 10 designates generally a control knob constructed in accordance with the present invention. The knob is formed with a hollow cylindrical or tubular body portion 11 open at its inner end but closed at its outer end by an integral head 12 which is equipped with a flange or skirt 13, the outer periphery of which may be ribbed or fluted to facilitate turning.

In accordance with the present invention, the tubular body portion 11 provides a socket 14, the inner peripheral wall of which is formed with a plurality of integral, longitudinally extending, parallel splines or corrugations 15. These splines or corrugations 15 may be provided in angularly spaced sets, and the inner peripheral wall of the socket intermediate these sets of splines is formed with diametrically opposite, longitudinally extending keyways 16. These keyways 16 are connected at their inner ends by a diametrically extending or transverse keyway 17 which is formed in the inner end wall of the socket.

A knob constructed in the manner described may be employed with either a round or flat shaft.

Figure 1:
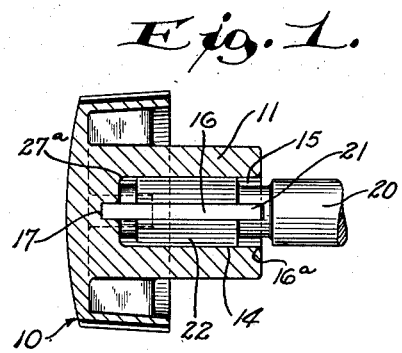
Figure 1 is a view partly in side elevation and partly in central, vertical, longitudinal cross section, showing the knob embodying the present invention and assembled with the outer end of a shaft of round stock.

As shown in Figure 1, a round shaft 20 is assembled with the knob 10. The shaft 20 has its inner end slotted or split as at 21, and the portions of the shaft on the opposite sides of the split are knurled or provided with a plurality of integral, longitudinally extending, parallel splines 22. The shaft 20 is constituted of resilient metal, and the outside diameter of its inner end is slightly greater than the inside diameter of the socket 11 so that when the knob 10 is forced on the end of the shaft the splines 20 and 15 of the shaft and knob, respectively, not only interfit and positively interlock, but the shaft sections on the opposite sides of its slot are forced toward each other against the inherent resiliency of the inner end of the shaft. As a consequence, the shaft 20 and knob 10 are not only rotatably coupled, but accidental displacement of the knob off of the end of the shaft is precluded.

Figure 3:
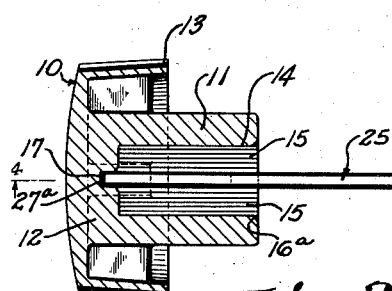
Figure 3 is a view in vertical cross section taken on line 3—3 of Figure 2, but illustrating a shaft of flat stock assembled with the knob, the shaft being shown in edge elevation.
Figure 4:
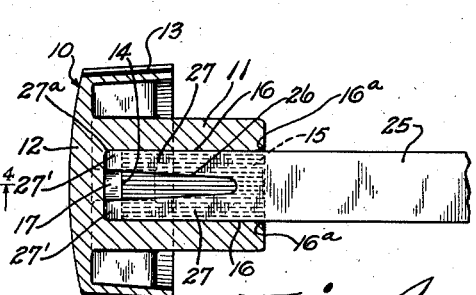
Figure 4 is a view in horizontal cross section taken on line 4—4 of Figure 3 and also illustrating a shaft of flat stock assembled with the knob.

In Figures 3 and 4, the knob is illustrated as assembled with a shaft 25 of flat stock. The shaft 25 also has its inner end split or slotted, as at 26, and its transverse dimension is slightly greater than the distance between the floors or walls of the keyways 16. When the knob is forced on the end of the shaft 25 the sections 27 on the opposite sides of the slot 26 are received in the keyways 16 and the inner end portions 27' are received in the transverse keyway 17. Here, again, the shaft is not only rotatably coupled to the knob and the shaft and knob centered, but accidental displacement of the knob off the end of the shaft is prevented. Assembly of the shaft 25 and knob 10 may be facilitated by rounding off or beveling the entrance to the keyways 16, as indicated at 16a and by putting a similar radius or bevel on the outer corners of the sections 27' of the shaft 25, as indicated at 27a.

Figure 5:
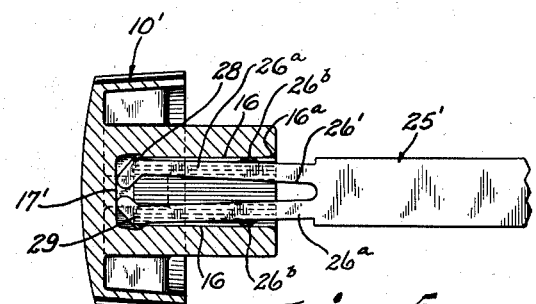
Figure 5 is a view similar to Figure 4 but showing a modification of the knob structure and also showing a slightly different type of flat stock shaft.

In the form of the invention shown in Figure 5, the knob designated at 10' is constructed in the manner described, save that the transverse keyway, designated at 17', extends radially or outwardly beyond the outer walls or floors of the keyways 16, thereby presenting locking shoulders 28 at the juncture of the keyways 16 and 17'. A shaft of flat stock, designated at 25', is assembled with the knob 10', and like the shaft 25 is split or slotted, as at 26', but instead of having flat and plain inner ends, the shaft 25' has the inner ends provided with hook formations 29 designed to releasably interlock with the shoulders 28 in the assembly. The sections 26a on the opposite sides of the split or slot 26' are formed with integral outwardly projecting lugs or keys 26b which snugly fit in and interlock with the keyways 16 to more rigidly and securely interconnect the shaft and knob.

While I have shown and described several constructions in which the invention may be advantageously embodied, it is to be understood that the constructions shown have been selected merely for the purpose of illustration or example, and that various changes in the size, shape, and arrangement of the parts may be made without departing from the spirit of the invention or the scope of the subjoined claims.

I claim:

1. An operating device of the character described comprising a control knob having a socket provided on its inner peripheral wall with diametrically opposite, longitudinally extending keyways, and having its inner end wall provided with a transversely extending keyway connecting said diametrically opposite keyways, and a shaft of flat stock having a split end assembled with the knob with the peripheral edge portions of the sections on the opposite side of the split interfitted with the diametrically opposite keyways of the socket and with the inner ends interfitted with the transversely extending keyway.

2. An operating device of the character described comprising a control knob having a socket provided on its inner peripheral wall with diametrically opposite, longitudinally extending keyways, and having its inner end wall provided with a transversely extending keyway connecting said diametrically opposite keyways, and a shaft of flat stock having a split end assembled with the knob with the peripheral edge portions of the sections on the opposite side of the split interfitted with the diametrically opposite keyways of the socket and with the inner ends interfitted with the transversely extending keyway, the transversely extending keyway having its ends extending radially outwardly beyond the floors of the diametrically opposite keyways to present locking shoulders, the outer corners at the inner ends of the sections of the split portion of the shaft having hook formations adapted to releasably interlock with said shoulders in the assembly.

3. A control knob adapted to be utilized interchangeably with round shafts having split knurled ends and with flat shafts having split ends, said knob having a socket provided on its inner peripheral wall with angularly spaced sets of longitudinally extending, inwardly directed splines adapted to interlock with knurls of a round shaft, diametrically opposite portions of the inner peripheral wall of said knob, intermediate said angularly spaced sets of splines, being formed with longitudinal keyways located radially outwardly of the bottoms of the recesses formed by the splines and adapted to interlock with the peripheral edges of a flat shaft.

4. A control knob adapted to be utilized interchangeably with round shafts having split knurled ends and with flat shafts having split ends, said knob having a socket provided on its inner peripheral wall with angularly spaced sets of longitudinally extending, inwardly directed splines adapted to interlock with knurls of a round shaft, diametrically opposite portions of the inner peripheral wall of said knob, intermediate said angularly spaced sets of splines, being formed with longitudinal keyways located radially outwardly of the bottoms of the recesses formed by the splines and adapted to interlock with the peripheral edges of a flat shaft, the inner end wall of the socket also having a transverse keyway in intersecting relation with the inner ends of the longitudinal keyways and adapted to interlock with the inner end portion of a flat shaft.

5. A control knob adapted to be utilized interchangeably with round shafts having split knurled ends and with flat shafts having split ends, said knob having a socket provided on its inner peripheral wall with angularly spaced sets of longitudinally extending, inwardly directed splines adapted to interlock with knurls of a round shaft, diametrically opposite portions of the inner peripheral wall of said knob, intermediate said angularly spaced sets of splines, being formed with longitudinal keyways located radially outwardly of the bottoms of the recesses formed by the splines and adapted to interlock with the peripheral edges of a flat shaft, the entrances to said keyways being beveled to facilitate the assembly of the knob with a flat shaft.

HARRY W. RUBINSTEIN.